D. H. DOTTERER.
Car-Wheels.
No. 147,915. Patented Feb. 24, 1874.
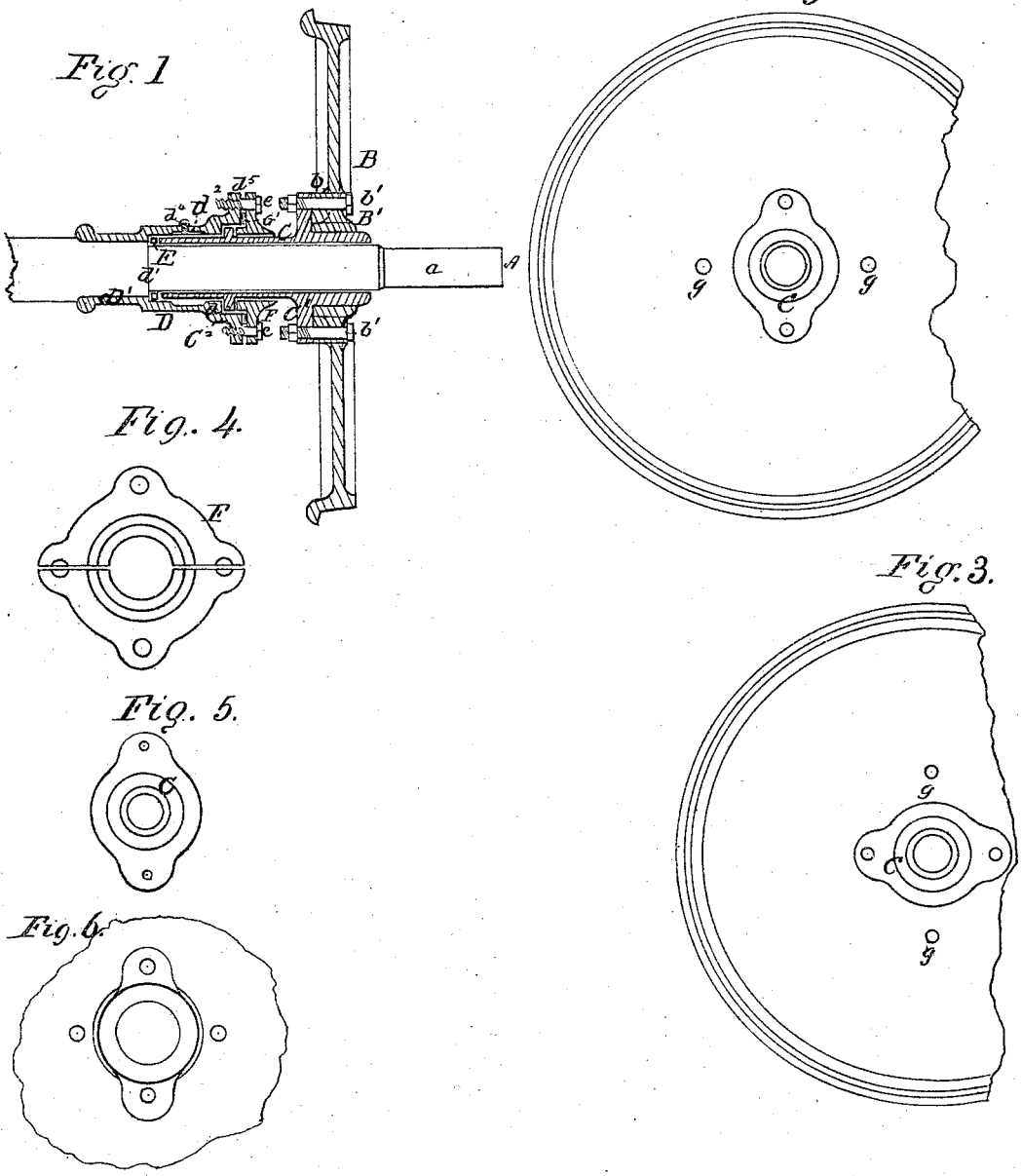

UNITED STATES PATENT OFFICE.

DAVIS H. DOTTERER, OF PHILADELPHIA, PENNSYLVANIA.

IMPROVEMENT IN CAR-WHEELS.

Specification forming part of Letters Patent No. 147,915, dated February 24, 1874; application filed June 12, 1873.

*To all whom it may concern:*

Be it known that I, DAVIS H. DOTTERER, of Philadelphia, in the county of Philadelphia and State of Pennsylvania, have invented certain new and useful Improvements in Car-Wheels; and I do hereby declare the following to be a full, clear, and exact description of the invention, such as will enable others skilled in the art to which it pertains to make and use it, reference being had to the accompanying drawings, which form part of this specification.

Referring to the drawings, Figure 1 is a vertical central sectional view of wheel and attachment embodying my invention. Fig. 2 is a front view of wheel. Fig. 3 is a view of the glands, showing lugs. Fig. 4 is a view back of the lugs, to which the wheel is bolted. Fig. 5 is a view of the wheel with part of disk broken away and the sleeve removed.

My invention has for its object to effect the following results: First, to prevent the slipping of the wheels in turning curves, and in cases where the wheel on one end of the axle is of greater circumference than the wheel on the other end; second, to prevent the chafing of the rails and flanges in turning curves; third, to strengthen the axle at the point where it is most liable to break.

The nature of the invention consists in the construction and combination of the several parts, as hereinafter fully described.

Referring to the accompanying drawing, which illustrates my invention, A is an axle, of which the part $a$ fits and turns in a box of usual or any suitable construction. B is the wheel, having a hub, B′, formed with lugs $b\ b$, for the reception of bolts $b'\ b'$. C is a sleeve, mounted loosely upon the axle A, and cast with a flange, C$^1$, to which the wheel B is drawn and secured by the bolts $b'\ b'$, and a collar, C$^2$, against which the shoulder $d$ of the socket D fits. The socket D fits tightly at the part D′ upon the axle A, the other part encircling the sleeve C, as shown. A loose metallic ring, E, is placed between the end of the sleeve C and the shoulder $d^1$ of the socket D. $d^2$ is an oil-chamber in the socket D, to which access is had by means of the screw-hole $d^4$. It will be observed that the oil cannot escape from this chamber without lubricating all the working parts. $d^5$ is a flange upon the end of the socket D, having lugs for the reception of the bolts $e\ e$, by which the socket is secured to the sectional gland F. Between the flange $d^5$ and the gland F is a leather ring, G′, which is designed to form an oil-tight joint. The object of the loose ring E is to present two wearing-surfaces, thereby reducing friction.

To draw on new wheels, remove the bolts $b'\ b'$ and insert two long threaded bolts, by screwing which the wheel is drawn on; then remove these long bolts and replace the bolts $b'\ b'$, and screw them up so as to bring the hub of the wheel against the flange C$^1$.

It is not required that the wheels should be forced on very tight, as the flange C$^1$, in connection with the bolts $b'\ b'$, holds them firmly in position.

The advantages of this construction are, first, the wheels can revolve independently of the axle, thereby preventing slipping, chafing, and friction on curves, and in case the circumference of one wheel is greater than that of the other on the same axle; second, the strengthening of the axle at the point where it is most liable to break, this being effected by means of the sleeve C, which affords support to the axle, and relieves it of much of the strain; third, as the wheels are not required to be drawn on so tight as in the usual construction, the tendency to burst by the expansion of the axle from heating is greatly diminished, and their weight is materially reduced by making a smaller hub; fourth, where journals and brasses cut and become heated by friction, in such case the wheels will revolve, and the axle remain in a state of rest, thereby preventing detention of trains, and damage to journals and boxes; fifth, the facility with which the wheels can be put on and taken off, dispensing with the necessity of sending them to a wheel-foundry for that purpose.

What I claim as my invention is—

1. The combination of the wheel B and sleeve C, as set forth.

2. The sleeve C, having the flange $C^1$ and collar $C^2$, as set forth.

3. The combination of the sleeve C and socket D, as set forth.

4. The socket D, fitting tightly upon the axle A, as described, in combination with the gland F, as set forth.

5. The combination of the sleeve C, socket D, and gland F, as set forth.

In testimony that I claim the foregoing I have hereunto set my hand this 6th day of June, 1873.

DAVIS H. DOTTERER.

Witnesses:
GEO. C. SHELMERDINE,
M. DANL. CONNOLLY.